(12) United States Patent
Liu

(10) Patent No.: US 8,832,727 B2
(45) Date of Patent: Sep. 9, 2014

(54) METHOD AND AUTHENTICATION SERVER FOR VERIFYING ACCESS IDENTITY OF SET-TOP BOX

(75) Inventor: Chen Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/611,369

(22) Filed: Sep. 12, 2012

(65) Prior Publication Data

US 2013/0276019 A1    Oct. 17, 2013

(30) Foreign Application Priority Data

Oct. 18, 2011  (CN) .......................... 2011 1 0316790

(51) Int. Cl.
| | |
|---|---|
| H04N 7/167 | (2011.01) |
| H04N 21/426 | (2011.01) |
| H04N 21/4408 | (2011.01) |
| H04N 21/258 | (2011.01) |
| H04N 21/658 | (2011.01) |
| H04N 21/458 | (2011.01) |
| H04N 21/262 | (2011.01) |
| G06F 21/30 | (2013.01) |

(52) U.S. Cl.
CPC ... *H04N 21/25875* (2013.01); *H04N 21/42684* (2013.01); *H04N 21/4408* (2013.01); *H04N 21/6582* (2013.01); *H04N 21/4586* (2013.01); *H04N 21/26291* (2013.01); *H04N 21/25816* (2013.01); *G06F 21/30* (2013.01)
USPC ............................................ 725/31; 713/150

(58) Field of Classification Search
CPC ..................................................... H04N 21/41
USPC ...................... 725/30, 31; 713/750
See application file for complete search history.

(56) References Cited

U.S. PATENT DOCUMENTS 6,792,474 B1     9/2004  Hopprich et al.
6,823,454 B1 *  11/2004  Hind et al. .................... 713/168

(Continued)

FOREIGN PATENT DOCUMENTS

| CN | 1933493 A | 3/2007 |
| CN | 101076109 A | 11/2007 |

(Continued)

OTHER PUBLICATIONS

Extended European Search Report issued in corresponding European Patent Application No. 12183409.7, mailed Apr. 18, 2013.

(Continued)

*Primary Examiner* — Mark D Featherstone
*Assistant Examiner* — Tien M Nguyen
(74) *Attorney, Agent, or Firm* — Brinks Gilson & Lione

(57) ABSTRACT

Embodiments of the present invention disclose a method and an authentication server for verifying an access identity of a set-top box, and relate to the field of communication technologies The method of the present invention includes: receiving a verification request message sent by a set-top box, where the verification request message carries first identity cipher text information of the set-top box, software version information of the set-top box, and a user serial number, and the first identity cipher text information is generated by the set-top box according to identity information of the set-top box by using a first encryption algorithm; obtaining the identity information of the set-top box from the first identity cipher text information according to the user serial number by using a preset first decryption algorithm; and verifying the identity information of the set-top box according to the software version information.

10 Claims, 7 Drawing Sheets

(56) References Cited

U.S. PATENT DOCUMENTS

| | | | |
|---|---|---|---|
| 7,770,003 B2* | 8/2010 | Herbert et al. | 713/160 |
| 2004/0034771 A1* | 2/2004 | Edgett et al. | 713/168 |
| 2005/0027868 A1 | 2/2005 | Dodson et al. | |
| 2010/0107223 A1* | 4/2010 | Zheng | 726/3 |
| 2010/0232518 A1* | 9/2010 | Coleman, Sr. | 375/240.26 |
| 2011/0154383 A1* | 6/2011 | Hao et al. | 725/8 |

FOREIGN PATENT DOCUMENTS

| | | |
|---|---|---|
| CN | 101145906 A | 3/2008 |
| CN | 101184204 A | 5/2008 |
| CN | 101640690 A | 2/2010 |
| CN | 102123157 A | 7/2011 |
| KR | 20100088729 A | 8/2010 |
| WO | WO 2008022514 A1 | 2/2008 |
| WO | WO 2010106518 A1 | 9/2010 |

OTHER PUBLICATIONS

Droms et al., "Authentication for DHCP Messages" Network Working Group, Jun. 2001.

International Search Report issued in corresponding PCT Patent Application No. PCT/CN2012/082602, mailed Jan. 17, 2013.

* cited by examiner

METHOD AND AUTHENTICATION SERVER FOR VERIFYING ACCESS IDENTITY OF SET-TOP BOX

CROSS-REFERENCE TO RELATED APPLICATION

This application claims priority to Chinese Patent Application No. 201110316790.0, filed on Oct. 18, 2011, which is hereby incorporated by reference in its entirety.

FIELD OF THE INVENTION

The present invention relates to the field of communication technologies, and in particular, to a method and an authentication server for verifying an access identity of a set-top box.

BACKGROUND OF THE INVENTION

With the increasing development of communication technologies, digital television becomes popular and users of the digital television are increasing gradually. A set-top box (digital video converting box) is one of devices required for using the digital television. However, access identities of set-top boxes are frequently stolen. In order to protect interests of consumers and manufacturers, the prior art provides some solutions for verifying the access identities of set-top boxes. A mainly used solution for verifying an access identity of a set-top box is a digest verification solution.

Specifically, the digest verification solution is: A set-top box sends verification information such as a user serial number and a password to an authentication server; after checking that the verification information is correct, the authentication server sends a challenge message to the set-top box; after receiving the challenge message sent from the authentication server, the set-top box sends a verification response message to the authentication server; the authentication server generates a digest by using a digest algorithm according to the received verification information and matches the digest with a corresponding application server; the authentication server selects an application server according to a result of the matching and sends the user serial number and a login token to the selected application server; the authentication server sends a login success message to the set-top box, where the login success message includes a login token, where the login token included in the login success message is the same as the login token sent by the authentication server to the application server; the set-top box sends a request message to the application server, where the request message includes the user serial number and a login token, where the login token included in the request message is the same as the login token sent by the authentication server to the set-top box; after receiving the request message sent from the set-top box, the application server matches the user serial number and the login token that are sent by the authentication server with the user serial number and the login token that are in the request message, and if the two are the same, sends service data to the set-top box and the set-top box starts to provide a service to a user; after the service is complete normally, the set-top box sends a logout request to the authentication server and the application server, and the authentication server and the application server delete the previous login token.

During a process of implementing the foregoing invention, the inventor finds that the prior art has at least the following problems:

According to this solution, in a process of verifying an identity, the digest is generated by using the digest algorithm, and input of the digest algorithm has corresponding plain text information in a network exchange packet before digest information is sent, so that the digest algorithm can be easily stolen, which reduces accuracy of access identity authentication. Moreover, the digest algorithm cannot be updated, and once it is decoded, an access identity of a true user will always be stolen, which reduces security of access identity authentication.

SUMMARY OF THE INVENTION

The embodiments of the present invention adopt the following technical solutions.

In one aspect, an embodiment of the present invention provides a method for verifying an access identity of a set-top box, where the method includes:

receiving a verification request message sent by a set-top box, where the verification request message carries first identity cipher text information of the set-top box, software version information of the set-top box, and a user serial number, and the first identity cipher text information is generated by the set-top box according to identity information of the set-top box by using a first encryption algorithm;

obtaining the identity information of the set-top box from the first identity cipher text information according to the user serial number by using a preset first decryption algorithm; and verifying the identity information of the set-top box according to the software version information.

In another aspect, an embodiment of the present invention provides an authentication server for verifying an access identity of a set-top box, where the authentication server includes:

a first receiving module, configured to receive a verification request message sent by a set-top box, where the verification request message carries first identity cipher text information of the set-top box, software version information of the set-top box, and a user serial number, and the first identity cipher text information is generated by the set-top box according to identity information of the set-top box by using a first encryption algorithm;

a decrypting module, configured to obtain the identity information of the set-top box from the first identity cipher text information according to the user serial number by using a preset first decryption algorithm; and a checking module, configured to verify the identity information of the set-top box according to the software version information.

A set-top box includes:

a filling module, configured to fill a verification request message in option information of a dynamic host configuration protocol server;

a first sending module, configured to send the option information;

a third receiving module, configured to receive an IP address allocated by the dynamic host configuration protocol server to the set-top box; and a fourth sending module, configured to send a service request to a broadcast television network.

DETAILED DESCRIPTION OF THE EMBODIMENTS

The technical solutions of the embodiments of the present invention are described clearly and completely below with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without creative efforts shall fall within the protection scope of the present invention.

In order to make the advantages of the technical solutions of the present invention more clear, the present invention is described in detail below with reference to the accompanying drawings and embodiments.

Embodiment 1

Figure 1:
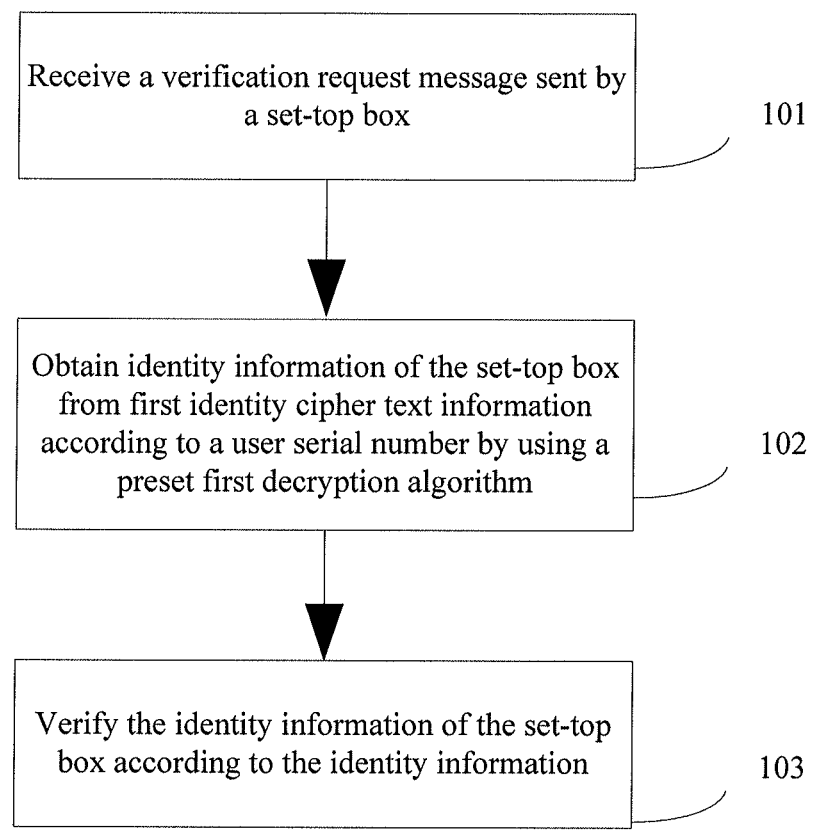
FIG. 1 is a flowchart of a method for verifying an access identity of a set-top box according to a first embodiment of the present invention.

This embodiment of the present invention provides a method for verifying an access identity of a set-top box. As shown in FIG. 1, the method includes:

Step 101: Receive a verification request message sent by the set-top box.

The verification request message carries first identity cipher text information of the set-top box, software version information of the set-top box, and a user serial number. A first identity cipher text is generated by the set-top box according to identity information of the set-top box by using a first encryption algorithm. The identity information of the set-top box includes a set-top box serial number and a MAC address.

Step 102: Obtain the identity information of the set-top box from the first identity cipher text information according to the user serial number by using a preset first decryption algorithm.

Step 103: Verify the identity information of the set-top box according to the identity information.

In the method provided in the embodiment of the present invention, identity cipher text information can be generated by using the encryption algorithm in the set-top box, and is sent to the authentication server with the verification request message. After receiving the verification request message, the authentication server obtains the identity information from the identity cipher text information by using the decryption algorithm and verifies the identity information. Compared with the prior art, in the method for verifying an access identity of a set-top box provided in the embodiment of the present invention, the identity information in the verification request message sent by the set-top box is encrypted. Therefore, accuracy of access identity authentication of the set-top box can be improved, and furthermore, an encryption algorithm and a decryption algorithm that are used to verify an access identity can be updated, thereby improving security of access identity authentication.

Embodiment 2

Figure 2:
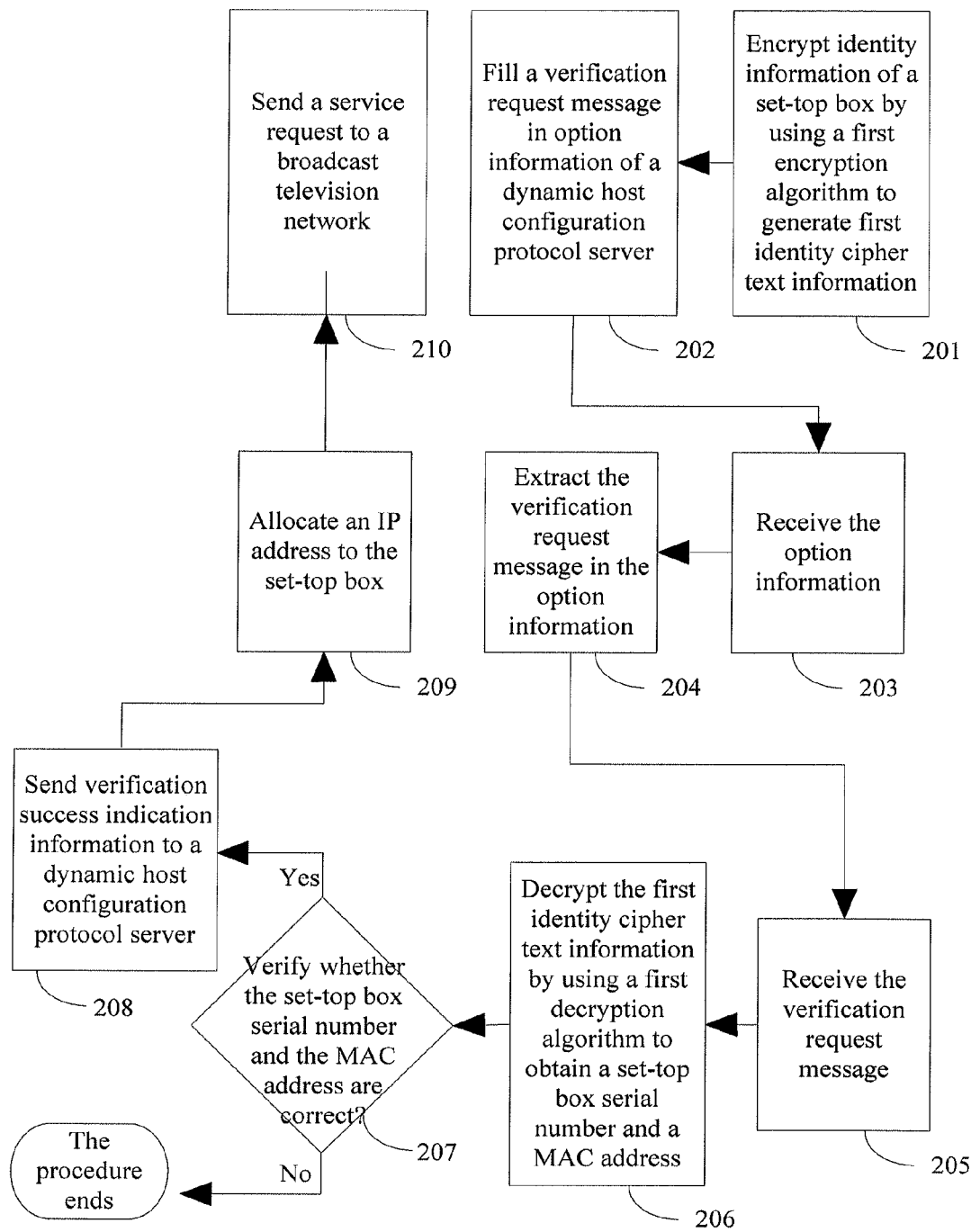
FIG. 2 is a flowchart of a specific example of a method for verifying an access identity of a set-top box according to a second embodiment of the present invention.

This embodiment of the present invention provides a method for verifying an access identity of a set-top box. As shown in FIG. 2, the method includes:

Step 201: Encrypt identity information of the set-top box by using a first encryption algorithm to generate first identity cipher text information.

The identity information of the set-top box includes a set-top box serial number and a MAC address.

Specifically, in the embodiment, a set-top box having a back transmission function is used. An encryption program is stored in an internal memory of the set-top box. For example, 96-byte data is stored in a flash memory chip that serves as an internal memory. The data is a secret key used to encrypt a verification request message. The encryption program has functions of transmitting data, receiving IP address information, and receiving update data and updating an encryption algorithm according to the update data.

Specifically, in the embodiment, there may be multiple encryption manners for encrypting the identity information of the set-top box by using the first encryption algorithm. For example, encrypt the set-top box serial number and the MAC address by using a DES (Data Encryption Standard, data encryption standard) algorithm to form a cipher text, the secret key of which is first 7 bytes of data stored in the flash memory chip. When the DES algorithm is used to perform encryption to form the cipher text, in order to further enhance confidentiality of a first identity cipher text, timestamp information may also be included in an encryption calculation process. The DES algorithm is commonly known in the field and is not described here.

Step 202: Fill the verification request message in option information of a dynamic host configuration protocol server.

The verification request message includes software version information, a user serial number, the first identity cipher text information, and the timestamp information.

The timestamp information is timestamp information when the set-top box calculates the first identity cipher text by using the first encryption algorithm.

Specifically, in the embodiment, the set-top box may fill the software version information, the user serial number, and the first identity cipher text in an Option60 field of a packet sent to the dynamic host configuration protocol server, and then send the packet to the dynamic host configuration protocol server through an IP network.

Step 203: The dynamic host configuration protocol server receives the option information.

The option information used for verification includes the software version information, the user serial number, and the first identity cipher text information.

Step 204: The dynamic host configuration protocol server extracts the verification request message in the option information and sends the verification request message to an authentication server.

Specifically, in the embodiment, after receiving the packet sent by the set-top box to the IP network, the dynamic host configuration protocol server extracts option information corresponding to the Option60 field in the packet, and sends the verification request message to the authentication server. The option information includes the software version information, the user serial number, and the first identity cipher text information.

Step 205: The authentication server receives the verification request message.

Step 206: The authentication server decrypts the first identity cipher text information according to the user serial number in the verification request message by using a first decryption algorithm to obtain the set-top box serial number and the MAC address.

Specifically, in the embodiment, the authentication server may use a secret key to decrypt the first identity cipher text information according to the user serial number by using the first decryption algorithm corresponding to the first encryption algorithm.

Step 207: The authentication server verifies, according to the software version information in the verification request message, whether the set-top box serial number and the MAC address that are obtained by using the first decryption algorithm are correct.

Specifically, in the embodiment, the authentication server obtains the set-top box serial number and the MAC address (if in step 201, the timestamp information is included in the encryption calculation process, timestamp information of the set-top box should also be obtained after the decryption) after decrypting the first identity cipher text information by using the first decryption algorithm, and verifies data obtained after the decryption with respect to different software versions. If a verification result is correct, step 208 is executed to notify or instruct the dynamic host configuration protocol server that its device access is valid and instruct the dynamic host configuration protocol server to allocate an IP address to the device; if a verification result is incorrect, it indicates that its device access is invalid and the procedure ends.

Step 208: The authentication server sends verification success indication information to the dynamic host configuration protocol server.

Step 209: The dynamic host configuration protocol server allocates an IP address to the set-top box.

After receiving the verification success indication information, the dynamic host configuration protocol server allocates an IP address to the set-top box, so that the set-top box obtains the IP address, and the set-top box that obtains the IP address may directly send a service request to a broadcast television network.

Step 210: The set-top box receives the allocated IP address and sends a service request to the broadcast television network.

The identity information of the set-top box further includes timestamp information when the set-top box calculates the first identity cipher text by using the first encryption algorithm or when the set-top box calculates a second identity cipher text by using a second encryption algorithm.

In the method provided in the embodiment of the present invention, identity cipher text information can be generated by using the encryption algorithm in the set-top box, and is sent to the authentication server with the verification request message. After receiving the verification request message, the authentication server obtains the identity information from the identity cipher text information by using the decryption algorithm and verifies the identity information. Compared with the prior art, in the method for verifying an access identity of a set-top box provided in the embodiment of the present invention, the identity information in the verification request message sent by the set-top box is encrypted. Therefore, accuracy of access identity authentication of the set-top box can be improved, and furthermore, an encryption algorithm and a decryption algorithm that are used to verify an access identity can be updated, thereby improving security of access identity authentication.

Embodiment 3

Figure 3:
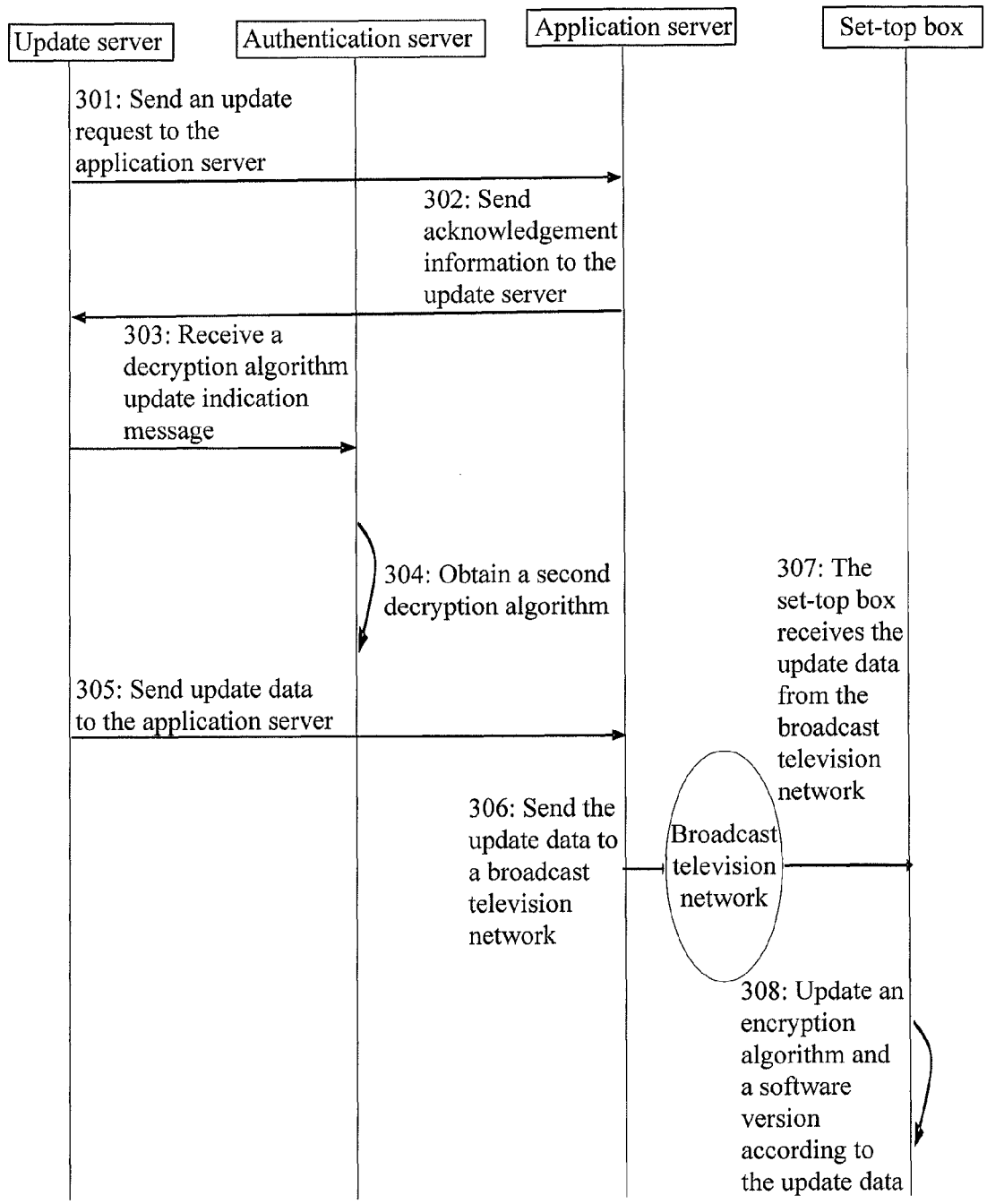
FIG. 3 is a flowchart of a specific example of a method for verifying an access identity of a set-top box according to a third embodiment of the present invention.

This embodiment of the present invention provides a method for verifying an access identity of a set-top box. As shown in FIG. 3, the method includes:

Step 301: An update server sends an update request to an application server.

To further improve accuracy of access identity verification of the set-top box, a decryption algorithm of an authentication server and an encryption algorithm of the set-top box may be updated. First, the update server sends the update request to the application server.

Step 302: The application server sends acknowledgement information to the update server.

Specifically, in the embodiment, after receiving the update request sent by the update server, the application server feeds back acknowledgement information to the update server.

Step 303: The authentication server receives a decryption algorithm update indication message sent by the update server.

The decryption algorithm update indication message includes a second decryption algorithm.

Specifically, in the embodiment, the update server sends the decryption algorithm update indication message to the authentication server, to cooperate in updating the encryption algorithm of the set-top box.

Step 304: The authentication server obtains the second decryption algorithm from the decryption algorithm update indication message.

The authentication server obtains the second decryption algorithm from the decryption algorithm update indication message, so that after receiving a verification request message sent by the set-top box next time, the authentication server can obtain identity information of the set-top box from second identity cipher text information by adopting the second decryption algorithm. At this point the update of the decryption algorithm of the authentication server is complete, so that the decryption algorithm used by the authentication server to verify the access identity is updated, which improves security of access identity authentication.

Specifically, in the embodiment, after receiving the decryption algorithm update indication message sent by the application server, the authentication server may adopt a new decryption algorithm and a secret key to perform decryption. The new decryption algorithm may be a decryption algorithm pre-stored in the authentication server, and may also be a decryption algorithm that is not pre-stored in the authentication server but received by the authentication server through an IP network.

Step 305: The update server sends update data to the application server. The update data includes a second encryption algorithm.

Specifically, in the embodiment, the update server sends encryption program data which is of the set-top box and adopts a 3DES encryption algorithm to the application server. A secret key of the 3DES encryption algorithm is first 21 bytes of data of 96-byte data stored in a flash memory chip when the set-top box is manufactured. Every 7 bytes form one group of secret keys and there are altogether 3 groups.

Step 306: The application server sends the update data to a broadcast television network.

Specifically, in the embodiment, the broadcast television network performs information authentication by adopting a conditional reception mode. The security is high, and the security of access identity authentication is improved. The conditional reception mode is commonly known in the field and is not described here.

Step 307: The set-top box receives the update data from the broadcast television network.

Step 308: The set-top box updates the encryption algorithm and a software version according to the update data.

The verification request message sent by the set-top box next time carries the second identity cipher text information of the set-top box, software version information of the set-top box, a user serial number, and timestamp information, where the second identity cipher text information is generated by the set-top box according to the identity information of the set-top box by using the second encryption algorithm, so that the encryption algorithm used by the set-top box in a process of verifying the access identity is updated, which improves the security of access identity authentication.

The timestamp information is timestamp information when the set-top box calculates a second identity cipher text by using the second encryption algorithm.

The identity information of the set-top box further includes the timestamp information when the set-top box calculates a first identity cipher text by using the first encryption algorithm or when the set-top box calculates the second identity cipher text by using the second encryption algorithm.

Specifically, in the embodiment, after receiving the delivered update data, the set-top box verifies its validity. If it is determined that the update data is valid, the set-top box updates the encryption algorithm and the software version according to the update data. After the update is complete, the set-top box adopts a new 3DES encryption algorithm and a secret key to encrypt a set-top box serial number and a MAC address. If it is determined that the update data is invalid, the set-top box deletes the update data.

In the method provided in the embodiment of the present invention, a new encryption algorithm delivered by the update server to the broadcast television network through the application server can be received from the broadcast television network through the set-top box. Meanwhile, the decryption algorithm in the authentication server can also be updated correspondingly, so that in the whole solution of the present invention, the new encryption algorithm and the new decryption algorithm can be used to perform the foregoing process of verifying the access identity of the set-top box. Compared with the prior art, in the embodiment of the present invention, an encryption algorithm and a decryption algorithm that are used to verify an access identity can be updated, thereby improving the security of access identity authentication.

Embodiment 4

Figure 4:
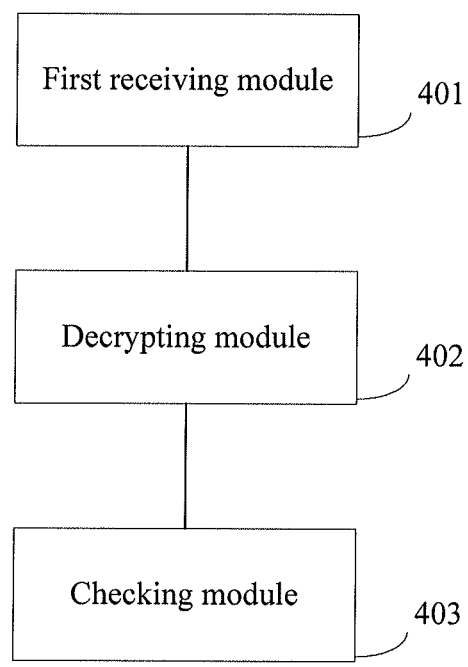
FIG. 4 is a schematic structural diagram of an apparatus for verifying an access identity of a set-top box according to a fourth embodiment of the present invention.

This embodiment of the present invention provides an authentication server for verifying an access identity of a set-top box. As shown in FIG. 4, the apparatus includes a first receiving module 401, a decrypting module 402, and a checking module 403.

The first receiving module 401 is configured to receive a verification request message sent by the set-top box.

The verification request message carries first identity cipher text information of the set-top box, software version information of the set-top box, and a user serial number. A first identity cipher text is generated by the set-top box according to identity information of the set-top box by using a first encryption algorithm. The identity information of the set-top box includes a set-top box serial number and a MAC address.

The decrypting module 402 is configured to obtain the identity information of the set-top box from the first identity cipher text information according to the user serial number by using a preset first decryption algorithm.

The checking module 403 is configured to verify the identity information of the set-top box according to the identity information.

In the authentication server for verifying an access identity of a set-top box provided in the embodiment of the present invention, the verification request message sent by the set-top box is received, where the verification request message includes identity cipher text information generated by the set-top box by using an encryption algorithm. After the first receiving module receives the verification request message, the decrypting module obtains the identity information from the identity cipher text information by using a decryption algorithm, and the checking module verifies the identity information. Compared with the prior art, in the embodiment of the present invention, accuracy of access identity authentication of the set-top box can be improved, and furthermore, an encryption algorithm and a decryption algorithm that are used to verify an access identity can be updated, thereby improving security of access identity authentication.

Embodiment 5

Figure 5:
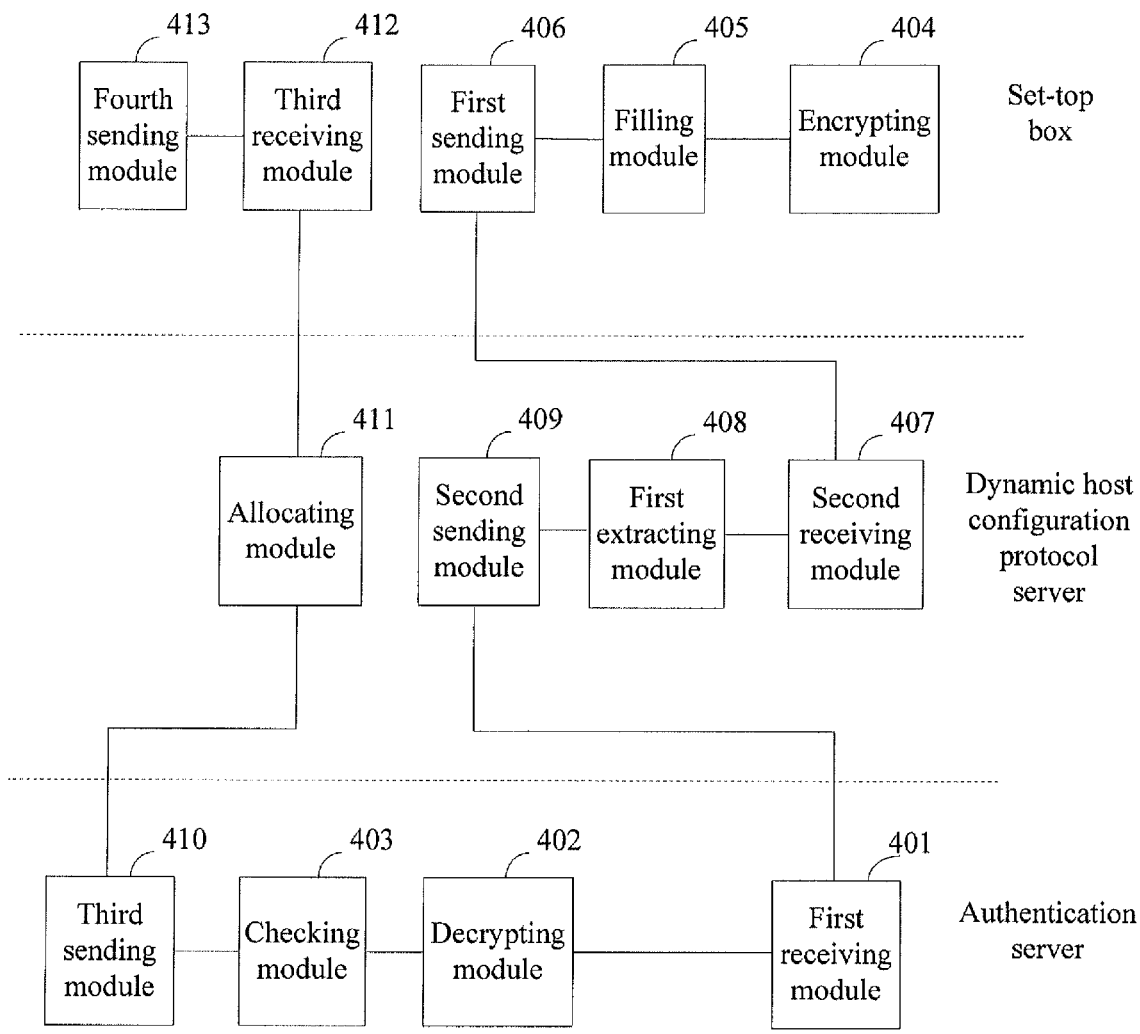
FIG. 5 is a schematic structural diagram of a specific example of an apparatus for verifying an access identity of a set-top box according to fifth, sixth, and seventh embodiments of the present invention.

This embodiment of the present invention provides a set-top box. As shown in FIG. 5, the set-top box includes an encrypting module 404, a filling module 405, a first sending module 406, a third receiving module 412, and a fourth sending module 413.

The encrypting module 404 is configured to encrypt identity information of the set-top box by using a first encryption algorithm to generate first identity cipher text information.

The identity information of the set-top box includes a set-top box serial number and a MAC address.

The filling module 405 is configured to fill a verification request message in option information of a dynamic host configuration protocol server.

The verification request message includes software version information, a user serial number, the first identity cipher text information, and timestamp information.

The timestamp information is timestamp information when the set-top box calculates a first identity cipher text by using the first encryption algorithm.

The first sending module 406 is configured to send the option information to an authentication server.

The authentication server obtains the identity information of the set-top box from the first identity cipher text information according to the user serial number by using a preset first decryption algorithm, and verifies the identity information of the set-top box.

The third receiving module 412 is configured to receive an IP address allocated by the dynamic host configuration protocol server to the set-top box after the option information passes the verification.

The dynamic host configuration protocol server allocates an IP address to the set-top box after receiving verification success indication information, so that the set-top box obtains the IP address, and the set-top box that obtains the IP address may directly send a service request to a broadcast television network.

The fourth sending module 413 is configured to send a service request to the broadcast television network after the set-top box obtains the IP address.

In the set-top box provided in the embodiment of the present invention, identity cipher text information can be generated by using an encryption algorithm in the encrypting module of the set-top box, and the verification request message can be filled in the option information of the dynamic host configuration protocol server by using the filling module, and afterwards, the option information is sent to the authentication server by using the first sending module. Compared with the prior art, in the embodiment of the present invention, accuracy of access identity authentication of the set-top box can be improved, thereby improving security of access identity authentication.

Figure 6:
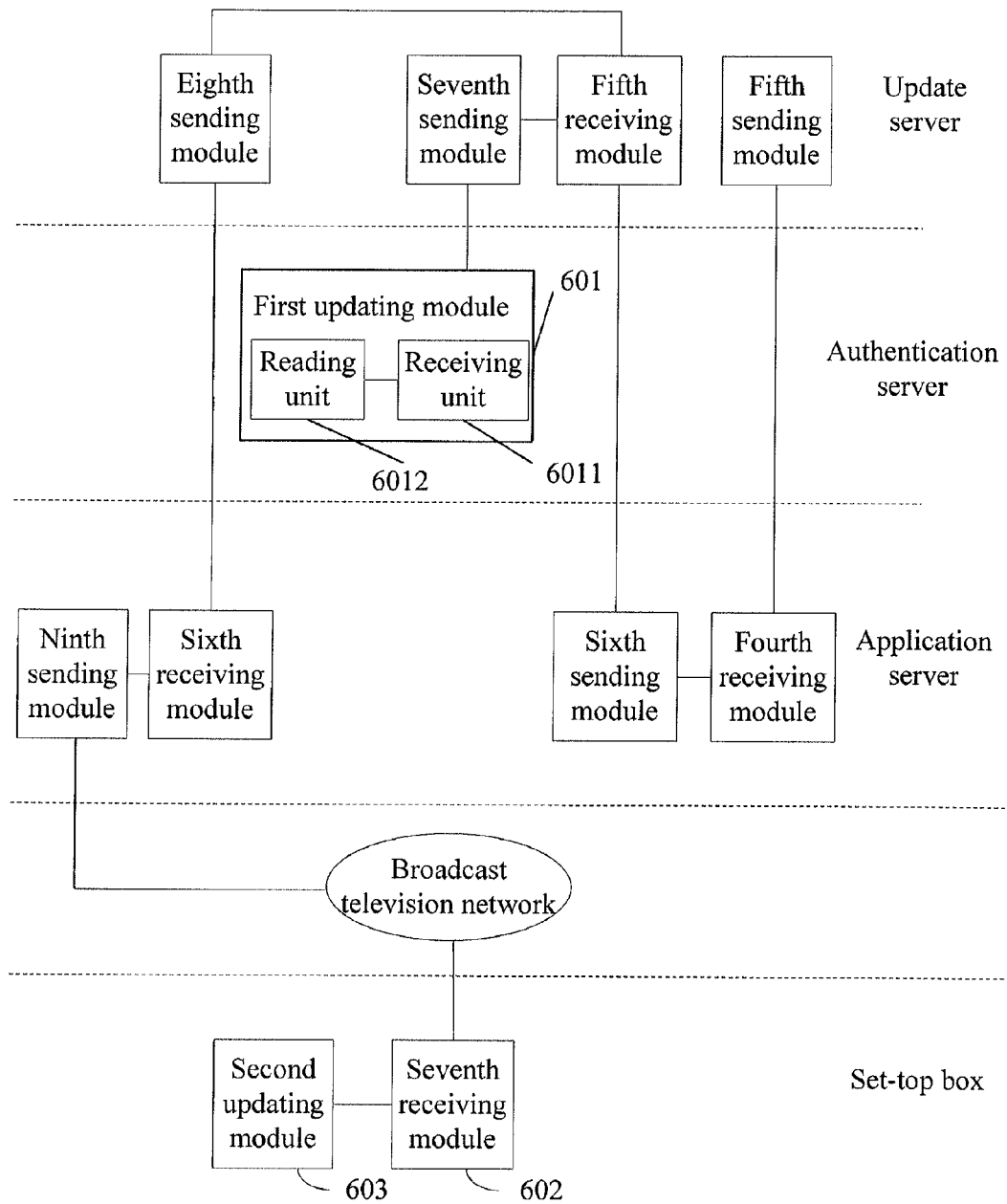
FIG. 6 is a schematic structural diagram of a specific example of an apparatus for verifying an access identity of a set-top box according to the seventh embodiment of the present invention.

Further, optionally, as shown in FIG. 6, the set-top box may further include a seventh receiving module 602 and a second updating module 603.

The seventh receiving module 602 is configured to receive update data sent by an update server.

The second updating module 603 is configured to update an encryption algorithm and a software version according to the update data.

Embodiment 6

This embodiment of the present invention provides a dynamic host configuration protocol server for verifying an access identity of a set-top box. As shown in FIG. 5, the dynamic host configuration protocol server includes a second receiving module 407, a first extracting module 408, a second sending module 409, and an allocating module 411.

The second receiving module 407 is configured to receive option information sent by a set-top box.

The option information includes software version information, a user serial number, and first identity cipher text information that are in a verification request message.

The first extracting module 408 is configured to extract the verification request message in the option information.

The second sending module 409 is configured to send the verification request message to an authentication server.

The allocating module 411 is configured to allocate an IP address to the set-top box.

The dynamic host configuration protocol server allocates an IP address to the set-top box after receiving verification success indication information, so that the set-top box obtains the IP address, and the set-top box that obtains the IP address may directly send a service request to a broadcast television network.

In the dynamic host configuration protocol server provided in the embodiment of the present invention, the option information sent by the set-top box can be received by using the second receiving module, the verification request message in the option information can be extracted by using the first extracting module, and afterwards, the option information is sent to the authentication server by using the second sending module. Meanwhile, the IP address may be allocated to the set-top box by using the allocating module. Compared with the prior art, in the embodiment of the present invention, accuracy of access identity authentication of the set-top box can be improved, thereby improving security of access identity authentication.

Embodiment 7

This embodiment of the present invention provides another authentication server for verifying an access identity of a set-top box. As shown in FIG. 5, the apparatus includes a first receiving module 401, a decrypting module 402, a checking module 403, and a third sending module 410.

The first receiving module 401 is configured to receive a verification request message sent by a dynamic host configuration protocol server.

The verification request message carries first identity cipher text information of the set-top box, software version information of the set-top box, and a user serial number. A first identity cipher text is generated by the set-top box according to identity information of the set-top box by using a first encryption algorithm. The identity information of the set-top box includes a set-top box serial number and a MAC address.

The decrypting module 402 is configured to obtain the identity information of the set-top box from the first identity cipher text information according to the user serial number by using a preset first decryption algorithm.

Further, after the authentication server obtains a second decryption algorithm from a decryption algorithm update indication message, the authentication server can obtain the identity information of the set-top box from second identity cipher text information by adopting the second decryption algorithm. The decrypting module 402 can then adopt a new decryption algorithm, so that a decryption algorithm used by the authentication server to verify the access identity is updated, which improves security of access identity authentication.

The checking module 403 is configured to verify the identity information of the set-top box according to the software version information.

The third sending module 410 is configured to send verification success indication information to the dynamic host configuration protocol server if the verification is successful.

The verification success indication information is used to instruct the dynamic host configuration protocol server to allocate an IP address to the set-top box, so that the set-top box that obtains the IP address may directly send a service request to a broadcast television network.

In the authentication server provided in the embodiment of the present invention, the verification request message can be received by using the first receiving module of the authentication server, the identity information can be obtained from identity cipher text information by using the decryption algorithm through the decrypting module, and verified by the checking module, and afterwards, the verification success indication information is sent to the dynamic host configuration protocol server by using the third sending module, so that in the whole solution of the present invention, a new decryption algorithm can be used to perform the foregoing process of verifying the access identity of the set-top box. Compared with the prior art, in the embodiment of the present invention, accuracy of access identity authentication of the set-top box can be improved, thereby improving security of access identity authentication.

Further, optionally, as shown in FIG. 6, the authentication server for verifying an access identity of a set-top box further includes a first updating module 601. The first updating module 601 includes a receiving unit 6011 and a reading unit 6012.

The first updating module 601 is configured to update the first decryption algorithm.

The receiving unit 6011 is configured to receive a decryption algorithm update indication message sent by an update server, where the decryption algorithm update indication message includes the second decryption algorithm.

Specifically, in the embodiment, the update server sends an update indication message to the authentication server.

The reading unit 6012 is configured to obtain the second decryption algorithm from the decryption algorithm update indication message, so as to adopt the second decryption algorithm to obtain the identity information of the set-top box from second identity cipher text information after receiving a verification request message sent by the set-top box next time.

Specifically, in the embodiment, after receiving the decryption algorithm update indication message sent by the application server, the authentication server may adopt a new decryption algorithm and a secret key to perform decryption. The new decryption algorithm may be a decryption algorithm pre-stored in the authentication server, and may also be a decryption algorithm that is not pre-stored in the authentication server but received by the authentication server through an IP network.

The verification request message sent by the set-top box next time carries the second identity cipher text information of the set-top box, the software version information of the set-top box, and the user serial number, where the second identity cipher text information is generated by the set-top box according to the identity information of the set-top box by using a second encryption algorithm. Moreover, the second encryption algorithm is received by the set-top box from the broadcast television network. Further, the second encryption algorithm is delivered by the update server to the broadcast television network through the application server.

Specifically, in the embodiment, as shown in FIG. 6, the update server includes:

A fifth sending module is configured to send an update request to the application server.

Specifically, in the embodiment, the update server sends the update request to the application server.

A fifth receiving module is configured to receive acknowledgement information sent by the application server.

Specifically, in the embodiment, the update server receives the acknowledgement information sent by the application server by using the fifth receiving module.

After the update server receives the acknowledgement information sent by the application server, the update server sends an update indication message to the authentication server to update the decryption algorithm, and sends update data to the application server.

A seventh sending module is configured to send the update indication message to the authentication server.

An eighth sending module is configured to send the update data to the application server. The update data includes the second encryption algorithm.

Specifically, in the embodiment, the update server sends encryption program data which is of the set-top box and adopts a 3DES encryption algorithm to the application server. A secret key of the 3DES encryption algorithm is first 21 bytes of data of 96-byte data stored in a flash memory chip when the set-top box is manufactured. Every 7 bytes form one group of secret keys and there are altogether 3 groups.

As shown in FIG. 6, the application server includes:

A fourth receiving module is configured to receive the update request.

A sixth sending module is configured to send the acknowledgement information to the update server.

Specifically, in the embodiment, after receiving the update request sent by the update server, the application server sends the acknowledgement information to the update server.

A sixth receiving module is configured to receive the update indication message sent by the update server.

The decryption algorithm update indication message includes the second decryption algorithm.

Specifically, in the embodiment, the authentication server receives the decryption algorithm update indication message sent by the update server, to cooperate in updating the encryption algorithm of the set-top box.

A ninth sending module is configured to send the update data to the broadcast television network.

Specifically, in the embodiment, the application server sends the update data to the broadcast television network by using the ninth sending module.

In the authentication server provided in the embodiment of the present invention, the decryption algorithm of the authentication server can be updated by using the first updating module, so that in the whole solution of the present invention, a new decryption algorithm can be used to perform the foregoing process of verifying the access identity of the set-top box. Compared with the prior art, in the embodiment of the present invention, the decryption algorithm used to verify the access identity can be updated, thereby improving security of access identity authentication.

Embodiment 8

Figure 7:
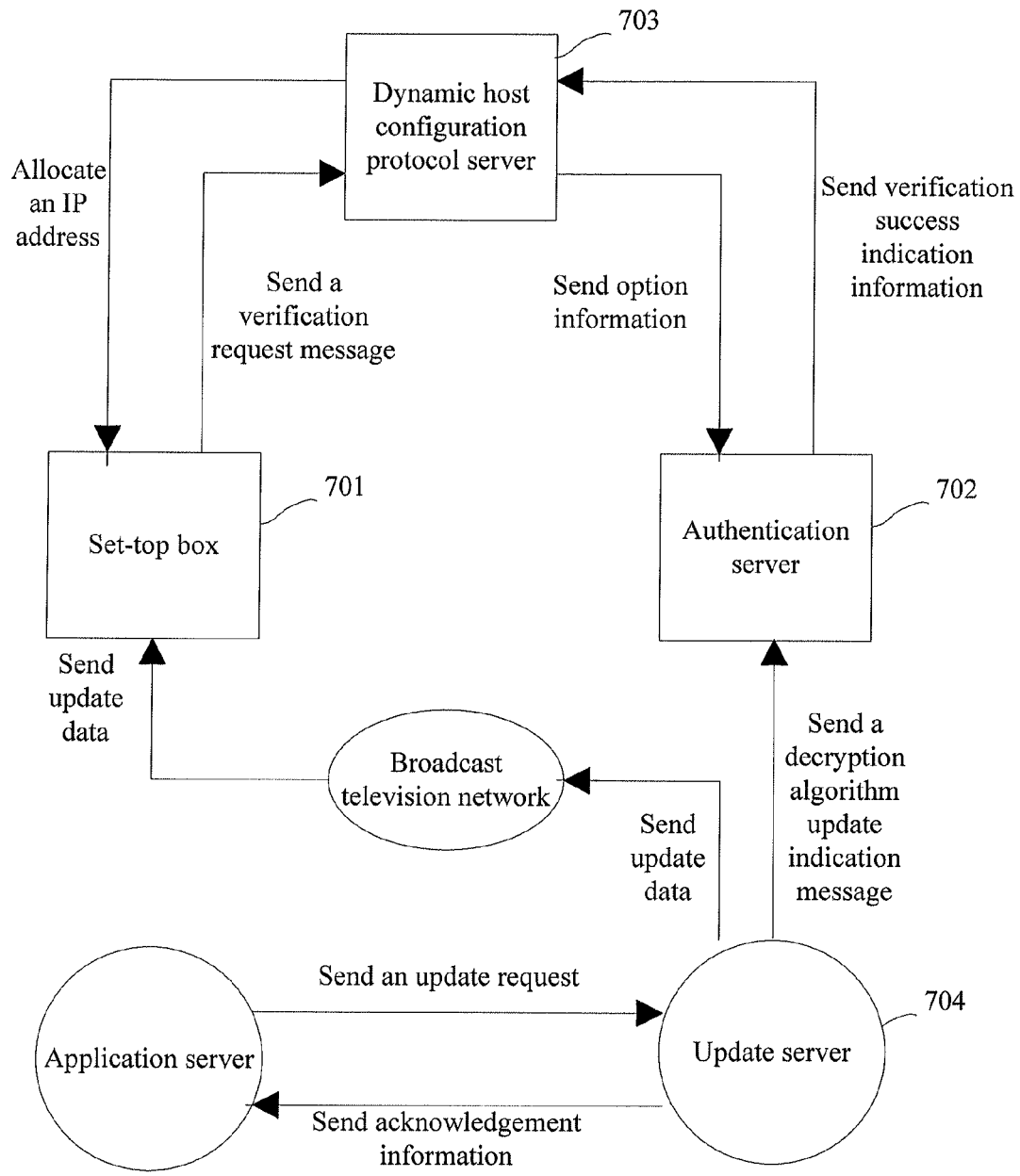
FIG. 7 is a structural diagram of a system for verifying an access identity of a set-top box according to an eighth embodiment of the present invention.

This embodiment of the present invention provides a system for verifying an access identity of a set-top box. As shown in FIG. 7, the system includes: a set-top box 701, an authentication server 702, and a dynamic host configuration protocol server 703.

The set-top box 701 is configured to fill first identity cipher text information, software version information of the set-top box, and a user serial number in option information of the dynamic host configuration protocol server, and send a verification request message to the dynamic host configuration protocol server. The verification request message carries the first identity cipher text information of the set-top box, the software version information of the set-top box, and the user serial number. The first identity cipher text information is generated by the set-top box according to identity information of the set-top box by using a first encryption algorithm. The identity information of the set-top box includes a set-top box serial number and a MAC address.

The authentication server 702 is configured to receive the option information sent by the dynamic host configuration protocol server, obtain the first identity cipher text information, the software version information of the set-top box, and the user serial number from the option information, and obtain the identity information of the set-top box from the first identity cipher text information according to the user serial number by using a preset first decryption algorithm; verify the identity information of the set-top box according to the software version information, and if the verification is successful, send verification success indication information to the dynamic host configuration protocol server, where the verification success indication information is used to instruct the dynamic host configuration protocol server to allocate an IP address to the set-top box.

The authentication server 702 is further configured to obtain a second decryption algorithm from a decryption algorithm update indication message, so as to adopt the second decryption algorithm to obtain the identity information of the set-top box from second identity cipher text information after receiving a verification request message sent by the set-top box next time, where the verification request message sent by the set-top box next time carries the second identity cipher text information of the set-top box, the software version information of the set-top box, and the user serial number, where the second identity cipher text information is generated by the set-top box according to the identity information of the set-top box by using a second encryption algorithm.

The dynamic host configuration protocol server 703 is configured to receive the verification request message sent by the set-top box, obtain the verification request message from the option information, and send the verification request message to the authentication server.

Further, optionally, the system further includes an update server 704, configured to send a decryption algorithm update indication message to the authentication server, where the decryption algorithm update indication message includes the second decryption algorithm.

In the system provided in the embodiment of the present invention, the set-top box generates identity cipher text information by using an encryption algorithm, and sends the identity cipher text information to the authentication server with the verification request message, and the authentication server obtains the identity information from a cipher text by using a decryption algorithm and verifies the identity information. Meanwhile, the set-top box can receive, from a broadcast television network, a new encryption algorithm that is delivered by the update server to the broadcast television network through the application server, and the decryption algorithm can also be updated correspondingly, so that in the whole solution of the present invention, the new encryption algorithm and a new decryption algorithm can be used to perform the foregoing process of identity information authentication. Compared with the prior art, in the embodiment of the present invention, accuracy of access identity authentication of the set-top box can be improved, and furthermore, an encryption algorithm and a decryption algorithm that are used to verify an access identity can be updated, thereby improving security of access identity authentication.

Persons of ordinary skill in the art may understand that all or part of the procedures in the apparatus provided in the foregoing embodiments may be implemented by a computer program instructing relevant hardware. The program may be stored in a computer readable storage medium, and when the program is executed, the procedures in the apparatus provided in the foregoing embodiments may be executed. The storage medium may be a magnetic disk, an optical disk, a read-only memory (Read-Only Memory, ROM), a random access memory (Read-Only Memory, RAM), and so on.

The foregoing is merely specific implementation manners of the present invention, and is not intended to limit the protection scope of the present invention. Variations or replacements that may be easily derived by persons skilled in the prior art within the technical scope of the present invention should fall within the protection scope of the present invention. Therefore, the protection scope of the present invention is subject to the protection scope of the claims.

What is claimed is:

1. A method for verifying an access identity of a set-top box, comprising:
    receiving by a dynamic host configuration protocol (DHCP) server, a verification request message sent by a set-top box, wherein the verification request message carries option information of the DHCP server, which comprises: first identity cipher text information of the set-top box, software version information of the set-top box, and a user serial number, and the first identity cipher text information is generated by the set-top box according to identity information of the set-top box by using a first encryption algorithm, wherein the identity information of the set-top box comprises timestamp information when the set-top box calculates a first identity cipher text by using the first encryption algorithm or when the set-top box calculates a second identity cipher text by using a second encryption algorithm;
    forwarding by the DHCP server, the first identity cipher text information of the set-top box, the software version information of the set-top box, and the user serial number included in the option information to an authentication server;
    obtaining by the authentication server, the identity information of the set-top box from the first identity cipher text information according to the user serial number by using a preset first decryption algorithm;
    verifying by the authentication server, the identity information of the set-top box according to the software version information; and
    receiving by the authentication server, a decryption algorithm update indication message, wherein the decryption algorithm update indication message comprises a second decryption algorithm.

2. The method for verifying an access identity of a set-top box according to claim 1, further comprising:
    if verification is successful, sending by the authentication server, verification success indication information to the dynamic host configuration protocol server, wherein the verification success indication information is used to instruct the dynamic host configuration protocol server to allocate an IP address to the set-top box.

3. The method for verifying an access identity of a set-top box according to claim 2, further comprising:
    updating the first decryption algorithm.

4. The method for verifying an access identity of a set-top box according to claim 3, wherein the updating the first decryption algorithm comprises:
    obtaining by the authentication server, the second decryption algorithm from the decryption algorithm update indication message, so as to adopt the second decryption algorithm to obtain the identity information of the set-top box from second identity cipher text information after receiving a verification request message sent by the set-top box next time, wherein the second identity cipher text information is generated by the set-top box according to the identity information of the set-top box by using the second encryption algorithm.

5. An authentication server for verifying an access identity of a set-top box, comprising:
    a first receiving module, configured to receive forwarded from a dynamic host configuration protocol (DHCP) server, a verification request message sent by a set-top box, wherein the verification request message comprises option information which carries first identity cipher text information of the set-top box, software version information of the set-top box, and a user serial number, and a first identity cipher text is generated by the set-top box according to identity information of the set-top box by using a first encryption algorithm, wherein the identity information of the set-top box comprises timestamp information when the set-top box calculates the first identity cipher text by using the first encryption algorithm or when the set-top box calculates a second identity cipher text by using a second encryption algorithm;
    a decrypting module, configured to obtain the identity information of the set-top box from the first identity cipher text information according to the user serial number by using a preset first decryption algorithm;
    a checking module, configured to verify the identity information of the set-top box according to the software version information; and a first updating module, configured to update the first decryption algorithm, wherein the first updating module comprises a receiving unit configured to receive a decryption algorithm update indication message, wherein the decryption algorithm update indication message comprises a second decryption algorithm.

6. The authentication server for verifying an access identity of a set-top box according to claim 5, further comprising:

a third sending module, configured to send verification success indication information to the dynamic host configuration protocol server, if verification is successful, wherein the verification success indication information is used to instruct the dynamic host configuration protocol server to allocate an IP address to the set-top box.

7. The authentication server for verifying an access identity of a set-top box according to claim 6, wherein the first updating module comprises:

a reading unit, configured to obtain the second decryption algorithm from the decryption algorithm update indication message, so as to adopt the second decryption algorithm to obtain the identity information of the set-top box from second identity cipher text information after receiving a verification request message sent by the set-top box next time, wherein the verification request message sent by the set-top box next time carries the second identity cipher text information of the set-top box, the software version information of the set-top box, and the user serial number, wherein the second identity cipher text information is generated by the set-top box according to the identity information of the set-top box by using the second encryption algorithm.

8. A set-top box, comprising:

a filling module, configured to fill a verification request message in option information of a dynamic host configuration protocol (DHCP) server;

a first sending module, configured to send the option information to the DHCP server;

a third receiving module, configured to receive an IP address allocated by the dynamic host configuration protocol server to the set-top box after the option information passes verification;

a fourth sending module, configured to send a service request to a broadcast television network after the set-top box obtains the IP address; and a second updating module, configured to update an encryption algorithm and a software version according to update data that comprises a second encryption algorithm, and an encrypting module, configured to encrypt identity information of the set-top box by using a first encryption algorithm to generate first identity cipher text information, wherein the identity information of the set-top box further comprises timestamp information when the set-top box calculates the first identity cipher text by using the first encryption algorithm or when the set-top box calculates a second identity cipher text by using the second encryption algorithm.

9. The set-top box according to claim 8, wherein the verification request message carries first identity cipher text information of the set-top box, software version information of the set-top box, and a user serial number.

10. The set-top box according to claim 8, further comprising:

a seventh receiving module, configured to receive update data sent by an update server.

* * * * *